United States Patent
Kimura et al.

(10) Patent No.: US 9,262,665 B2
(45) Date of Patent: Feb. 16, 2016

(54) DECODING METHOD AND DECODING PROCESSING DEVICE

(75) Inventors: Kazuto Kimura, Hoofddorp (NL); You Tanaka, Hoofddorp (NL)

(73) Assignee: Opticon Sensors Europe B.V., Hoofddorp (NL)

( * ) Notice: Subject to any disclaimer, the term of this patent is extended or adjusted under 35 U.S.C. 154(b) by 398 days.

(21) Appl. No.: 13/807,667

(22) PCT Filed: Jun. 27, 2011

(86) PCT No.: PCT/JP2011/064711
§ 371 (c)(1),
(2), (4) Date: May 15, 2013

(87) PCT Pub. No.: WO2012/002335
PCT Pub. Date: Jan. 5, 2012

(65) Prior Publication Data
US 2013/0221103 A1    Aug. 29, 2013

(30) Foreign Application Priority Data
Jun. 30, 2010    (JP) .................................. 2010-150227

(51) Int. Cl.
*G06K 7/14* (2006.01)
*G06K 7/10* (2006.01)
(Continued)

(52) U.S. Cl.
CPC .............. *G06K 7/1478* (2013.01); *G06F 17/10* (2013.01); *G06K 7/10851* (2013.01); *G06K 7/1486* (2013.01); *G06K 9/52* (2013.01)

(58) Field of Classification Search
CPC ........ G06F 17/10; G06K 9/52; G06K 7/1486; G06K 7/1404; G06K 7/1478; G06K 7/14182; G06K 7/1473; G06K 7/1465; G06K 7/1452; G06K 7/10851
See application file for complete search history.

(56) References Cited

U.S. PATENT DOCUMENTS 4,000,397 A *  12/1976  Hebert et al. ............. 235/462.27
4,158,435 A *   6/1979  Nakanishi ........... G06K 7/10851
                                                      235/462.18
(Continued)

FOREIGN PATENT DOCUMENTS

DE    102006008727 A1    8/2007
EP        1150240 A2   10/2001
(Continued)

OTHER PUBLICATIONS

Related EP Application No. EP 11 80 0799 Search Report, Dec. 3, 2013, Publisher: EPO, Published in: EP.
(Continued)

*Primary Examiner* — Daniel Walsh
(74) *Attorney, Agent, or Firm* — Brundidge & Stanger, P.C.

(57) ABSTRACT

In a decoding method, photoelectric conversion is performed on light reflected by a code image, a read signal indicating intensity of the reflected light is produced, and the produced read signal is differentiated to produce a derivative signal. The inflection points of intensity of the reflected light in the read signal are detected from the derivative signal and peak levels, each of which is an extreme value of the intensity of the reflected light, the peak level corresponding to a width between the detected inflection points, are detected. A difference between the detected peak levels is then obtained and threshold values for decoding the read signal are set from the obtained difference. This enables the read signal to be decoded even when the code image is spotted with a stain or its printing quality is inferior or even when the read signal is read in its defocus state.

4 Claims, 13 Drawing Sheets

(51) Int. Cl.
*G06F 17/10* (2006.01)
*G06K 9/52* (2006.01)

(56) References Cited

U.S. PATENT DOCUMENTS

| | | | | |
|---|---|---|---|---|
| 4,716,438 | A * | 12/1987 | Farrell | 399/84 |
| 4,740,675 | A * | 4/1988 | Brosnan et al. | 235/462.27 |
| 4,798,943 | A * | 1/1989 | Cherry | 235/462.27 |
| 5,059,773 | A * | 10/1991 | Shimizu et al. | 235/436 |
| 5,103,080 | A * | 4/1992 | Barkan | 235/437 |
| 5,272,323 | A * | 12/1993 | Martino | 235/462.27 |
| 5,311,001 | A * | 5/1994 | Joseph et al. | 235/462.07 |
| 5,446,272 | A * | 8/1995 | Barkan | 235/454 |
| 5,525,787 | A * | 6/1996 | Kubo | 235/462.09 |
| 5,569,900 | A * | 10/1996 | Blohbaum | G06K 7/14 235/462.28 |
| 5,612,531 | A * | 3/1997 | Barkan | 235/462.27 |
| 5,734,939 | A * | 3/1998 | Yamazaki et al. | 396/284 |
| 5,864,129 | A * | 1/1999 | Boyd | 235/462.27 |
| 6,000,616 | A * | 12/1999 | Spitz | G06K 7/14 235/462.16 |
| 6,012,639 | A * | 1/2000 | Colley et al. | 235/462.16 |
| 6,168,081 | B1 | 1/2001 | Urano et al. | |
| 2002/0000466 | A1 * | 1/2002 | Lucera | G02B 26/106 235/462.01 |
| 2004/0011871 | A1 * | 1/2004 | Harper | G06K 7/10851 235/462.01 |
| 2004/0074967 | A1 * | 4/2004 | Takakura et al. | 235/462.08 |
| 2004/0129784 | A1 * | 7/2004 | Iwaguchi | G06K 7/14 235/462.16 |
| 2004/0164155 | A1 * | 8/2004 | Iwaguchi et al. | 235/462.08 |
| 2004/0164159 | A1 * | 8/2004 | Iwaguchi et al. | 235/462.16 |
| 2004/0164161 | A1 * | 8/2004 | Iwaguchi | G06K 7/10554 235/462.16 |
| 2005/0274809 | A1 | 12/2005 | Colley | |
| 2008/0277471 | A1 * | 11/2008 | Mashiko | 235/462.01 |
| 2009/0108069 | A1 * | 4/2009 | Mashiko | G06K 7/10683 235/462.25 |
| 2011/0087439 | A1 * | 4/2011 | Ziegler | G01N 21/35 702/19 |
| 2011/0220721 | A1 * | 9/2011 | Nakamura | 235/462.19 |
| 2011/0297747 | A1 * | 12/2011 | Naumovsky | G06Q 30/08 235/462.13 |
| 2012/0085823 | A1 * | 4/2012 | Nakamura | G06K 7/10851 235/462.16 |
| 2012/0118974 | A1 * | 5/2012 | Germaine et al. | 235/462.27 |
| 2012/0175421 | A1 * | 7/2012 | Murata et al. | 235/462.31 |

FOREIGN PATENT DOCUMENTS

| | | |
|---|---|---|
| JP | 55-080181 A | 6/1980 |
| JP | 09-128523 A | 5/1997 |
| JP | 11-272791 A | 10/1999 |
| JP | 2001-060244 A | 3/2001 |
| JP | 2001-209751 A | 8/2001 |
| JP | 2006-065909 A | 3/2006 |
| JP | 2007-080087 A | 3/2007 |

OTHER PUBLICATIONS

JPO, International Patent Application No. PCT/JP2011/064711 International Search Report, Jul. 13, 2011, Publisher: PCT, Published in: JP.

* cited by examiner

DECODING METHOD AND DECODING PROCESSING DEVICE

FIELD OF THE INVENTION

The present invention relates to a decoding method of decoding a read signal which indicates an intensity of reflected light from an object to be read and a decoding-processing apparatus thereof.

BACKGROUND OF THE INVENTION

A binarization processing in image recognition is an important technology which exerts an influence on any accuracy of decoded output result. The following will describe a typical image recognition.

In a patent document 1, a face authentication device has been disclosed which performs processing thereof while sorting in descending order of differential intensity. According to this face authentication device, a differential intensity image is produced from a gray-scale image, which is a face image, by differentiation, and processing for sorting pixels in the descending order of differential intensity is performed within a predefined area containing the extracted face parts in the produced differential intensity image. A threshold value is then set for a region selected only by a specified number of pixels, associated with the facial parts, as a region with intense concentration change and the rest region as a region with non-intense concentration change and the differential intensity image is output as a binarized image by use of the set thresholds.

In a patent document 2, a binarization system capable of performing binarization by differentiation has been disclosed. According to this binarization system, a code symbol, namely, a multi-level image signal is imaged by an image sensing device composed of CCD, CMOS or the like; to detect a zero crossing point by a zero crossing point detecting part, a second derivative is performed by a second derivative part; and a point (the zero crossing point) on which this second derivative signal is excessively changed from positive to negative or from negative to positive is detected by a sign changing point detection part. The next binarization threshold calculating part samples and holds a brightness value of the multi-level image signal output from a code reading part based on a trigger signal from the zero crossing point detecting part to output it to a binarization part as a binarization threshold value.

In a patent document 3, an optical character reader (OCR) capable of performing binarization by A/D conversion has been disclosed. In the OCR, an image processing is carried out by performing the A/D conversion on image data of an original imaged by CCD so that the original is as white background and the character is as black portion. For example, the dynamic range is extended by setting the difference of a maximum value (white side) and a minimum value (black side) in original read data as the reference voltage of A/D conversion and by performing the A/D conversion based on this reference voltage, accuracy of the binarization is enhanced.

In a patent document 4, optical disc play-back equipment capable of correctly performing a seek operation has been disclosed. In an optical pickup, the optical pickup is moved in the radial direction of the optical disc while an objective lens thereof is shifted respectively to the most inner peripheral position and the most outer peripheral position of its shift range. In this moment, a threshold value generating circuit obtains a first threshold value and a second threshold value being optimum for binarizing a signal before binarization in respective states, and sets an average value of the both threshold values to a threshold value register as the final threshold value. At the time of seek operation, the signal before binarization is binarized by the final threshold value. Thus, the first threshold value and the second threshold value are respectively obtained at the most inner peripheral position and the most outer peripheral position of the objective lens in its shift range in which the optimum value for binarizing is maximum or minimum and the average value of the both is set to a predetermined threshold value.

Next, the following will describe a process of the binarization processing in the image recognition in detail, taking as an example a code scanner which processes code symbol image optically.

This code scanner irradiates a laser beam or the like onto a code image 51 formed on an object 50 to be read as shown in FIG. 12, receives reflected light thereof and performs any electrical transactions thereon to read information contained in the code image 51.

For example, the code image 51 is composed of bars (For example, wide bars WB in which their widths are wide and narrow bars NB in which their widths are narrow) and spaces (For example, wide spaces WS in which their widths are wide and narrow spaces NS in which their widths are narrow). In addition, it is assumed that in this example, the object 50 to be read is spotted with a stain N.

Next, the following will describe an example of the binarization processing by such a code scanner. FIG. 13 is a diagram showing a waveform example of a read signal D1 in which a vertical axis indicates a signal level (intensity of the reflected light) and a horizontal axis indicates position. As shown in FIG. 13, the information contained in the code image 51 read by the code scanner is read as the read signal D1.

This read signal D1 contains a wide bar waveform WB1 which has a downward large convex shape, a narrow bar waveform NB1 which has a downward small convex shape, a wide space waveform WS1 which has an upward large convex shape and a narrow space waveform NS1 which has an upward small convex shape, which respectively correspond to the wide bar WB, the narrow bar NB, the wide space WS and the narrow space NS in the code image 51. Accordingly, when the object 50 to be read is spotted with the stain N as shown in FIG. 12, the read signal D1 contains any noise N1.

FIG. 14 is a diagram showing a waveform example of a derivative signal D2 in which a vertical axis indicates a signal level and a horizontal axis indicates position. The code scanner differentiates the read signal D1 to produce the derivative signal D2. As shown in FIG. 14, this derivative signal D2 has a waveform in which inflection points of the wide bar waveform WB1, the narrow bar waveform NB1, the wide space waveform WS1 and the narrow space waveform NS1 in the read signal D1 are their extreme values.

FIG. 15 is a diagram showing a waveform example of a binarization signal D3 in which a vertical axis indicates bar/space (the bar in a case of "0" and the space in a case of "1") and a horizontal axis indicates position. The code scanner produces the binarization signal D3 by using the inflection points of the derivative signal D2 as standing points thereof or falling points thereof.

As shown in FIG. 15, this binarization signal D3 contains a wide bar signal WB3, a narrow bar signal NB3, a wide space signal WS3 and a narrow space signal NS3, which respectively correspond to the wide bar waveform WB1, the narrow bar waveform NB1, the wide space waveform WS1 and the narrow space waveform NS1. Further, the binarization signal D3 contains also a noise signal N3 which corresponds to the noise N1 in the read signal D1.

Thus, when the object 50 to be read is spotted with the stain N, the binarization signal D3 contains the noise signal N3 so that it is impossible to decode the information contained in the code image 51 correctly.

Next, the following will describe an example of the binarization processing by the code scanner when the code scanner and the object 50 to be read are away from each other by a distance more than a predetermined distance (a focal distance) and a light-receiving surface of the code scanner deviates from an image forming surface of a lens to an optical axis direction (defocus state). FIG. 16 is a diagram showing a waveform example of a read signal D4 in which a vertical axis indicates a signal level (intensity of the reflected light) and a horizontal axis indicates position.

This read signal D4 contains a wide bar waveform WB4 which has a downward large convex shape, a narrow bar waveform NB4 which has a downward small convex shape, a wide space waveform WS4 which has an upward large convex shape and a narrow space waveform NS4 which has an upward small convex shape, which respectively correspond to the wide bar WB, the narrow bar NB, the wide space WS and the narrow space NS in the code image 51, which is similar to the read signal D1 described on FIG. 13. Incidentally, in this example, even when the object 50 to be read is spotted with the stain N as shown in FIG. 12, the read signal D4 contains no noise N1 like the read signal D1, because the code scanner and the object 50 to be read are away from each other by a distance more than the focal distance.

FIG. 17 is a diagram showing a waveform example of a derivative signal D5 in which a vertical axis indicates a signal level and a horizontal axis indicates position. The code scanner differentiates the read signal D4 to produce the derivative signal D4. As shown in FIG. 17, this derivative signal D5 has a waveform in which inflection points of the wide bar waveform WB4, the narrow bar waveform NB4, the wide space waveform WS4 and the narrow space waveform NS4 in the read signal D4 are their extreme values. All the width lengths between the inflection points become almost the same length.

FIG. 18 is a diagram showing a waveform example of a binarization signal D6 in which a vertical axis indicates bar/space (the bar in a case of "0" and the space in a case of "1") and a horizontal axis indicates position. The code scanner produces the binarization signal D6 by using the inflection points of the derivative signal D5 as standing points thereof or falling points thereof.

As shown in FIG. 18, this binarization signal D6 contains a wide bar signal WB6, a narrow bar signal NB6, a wide space signal WS6 and a narrow space signal NS6, which respectively correspond to the wide bar waveform WB4, the narrow bar waveform NB4, the wide space waveform WS4 and the narrow space waveform NS4.

Since all the width lengths between the inflection points are almost the same length as shown in FIG. 17, the wide bar signal WB6, the narrow bar signal NB6, the wide space signal WS6 and the narrow space signal NS6 all have almost the same length as each other. This disables the information contained in the code image 51 from being correctly decoded.

PRIOR ART DOCUMENTS

Patent Documents

Patent Document 1: Japanese Patent Application Publication No. 2007-80087
Patent Document 2: Japanese Patent Application Publication No. 2001-209751
Patent Document 3: Japanese Patent Application Publication No. H09-128523
Patent Document 4: Japanese Patent Application Publication No. 2006-65909

SUMMARY OF THE INVENTION

The Problem to be Solved by the Invention

It is conceivable that the reason why accuracy of output result is made inferior in the image recognition is because the object to be read is spotted with the stain as described in the above-mentioned code scanner or its printing quality is inferior. When reading the object in its defocus state, any accurate decoding thereof cannot be performed. These problems occur in the patent documents 1 through 4 and they are solved by altering the threshold value or increasing number of steps for a threshold calculation algorithm. Even in these cases, however, it takes much time for the calculation, a fast CPU therefor is necessary and/or a manufacture of the code scanner is expensive costly. They are unsuitable for a mass production technology.

Means for Solving the Problem

A decoding method according to this invention is characterized in that the method comprises a first step of performing photoelectric conversion on light reflected by an object to be read and producing a read signal indicating intensity of the reflected light, a second step of differentiating the read signal produced in the first step to produce a derivative signal, a third step of detecting inflection points of intensity of the reflected light in the read signal from the derivative signal produced in the second step and detecting peak levels, each of which is an extreme value of the intensity of the reflected light, the peak level corresponding to a width length between the detected inflection points, a fourth step of obtaining a difference between the peak levels detected in the third step and setting a threshold value for decoding the read signal from the obtained difference between the peak levels, and a fifth step of decoding the read signal based on the threshold value set in the fourth step.

In the decoding method according to this invention, the photoelectric conversion is performed on the light reflected by an object to be read, a read signal indicating intensity of the reflected light is produced, and the produced read signal is differentiated to produce a derivative signal. On the assumption of this, the inflection points of intensity of the reflected light in the read signal are detected from the produced derivative signal and peak levels, each of which is an extreme value of the intensity of the reflected light, the peak level corresponding to a width length between the detected inflection points, are detected. A difference between the detected peak levels is then obtained and a threshold value for decoding the read signal is set from the obtained difference between the peak levels. This enables the read signal to be decoded based on the set threshold value.

Further, a decoding-processing apparatus according to the invention is characterized in that the apparatus comprises a read signal producing portion which performs photoelectric conversion on light reflected by an object to be read and produces a read signal indicating intensity of the reflected light, a derivative signal producing portion which differentiates the read signal produced in the read signal producing portion to produce a derivative signal, a binarization portion which binarizes the read signal based on the derivative signal produced in the derivative signal producing portion, and a decoding portion which decodes the read signal that has been binarized by the binarization portion, wherein the binarization portion detects inflection points of intensity of the reflected light in the read signal from the derivative signal and detects peak levels, each of which is an extreme value of the intensity of the reflected light, the peak level corresponding to a width length between the detected inflection points, and wherein the decoding portion obtains a difference between the peak levels detected by the binarization portion, sets a threshold value for decoding the read signal from the obtained difference between the peak levels, and decodes the read signal based on the set threshold value.

Effect of the Invention

By the decoding method and the decoding-processing apparatus according to the invention, it is possible to decode the read signal without using any complicated algorithm or fast CPU even when printing quality of the code image (object to be read) is inferior or even when the code image is read in its defocus state to produce the read signal. As a result thereof, it is possible to provide the decoding method and the decoding-processing apparatus by which a read performance is improved.

DETAILED DESCRIPTION

This invention has an object to provide the decoding method and the decoding-processing apparatus by which the read signal of code image can be decoded without using any complicated algorithm or fast CPU or even when the object to be read is spotted with a stain or its printing quality is inferior or it can be decoded even when the read signal is read in its defocus state.

The following will describe a code scanner as one example in the embodiments of the decoding-processing apparatus according to the invention with reference to drawings.

First Embodiment (Configuration Example of Code Scanner 100)

Figure 1:
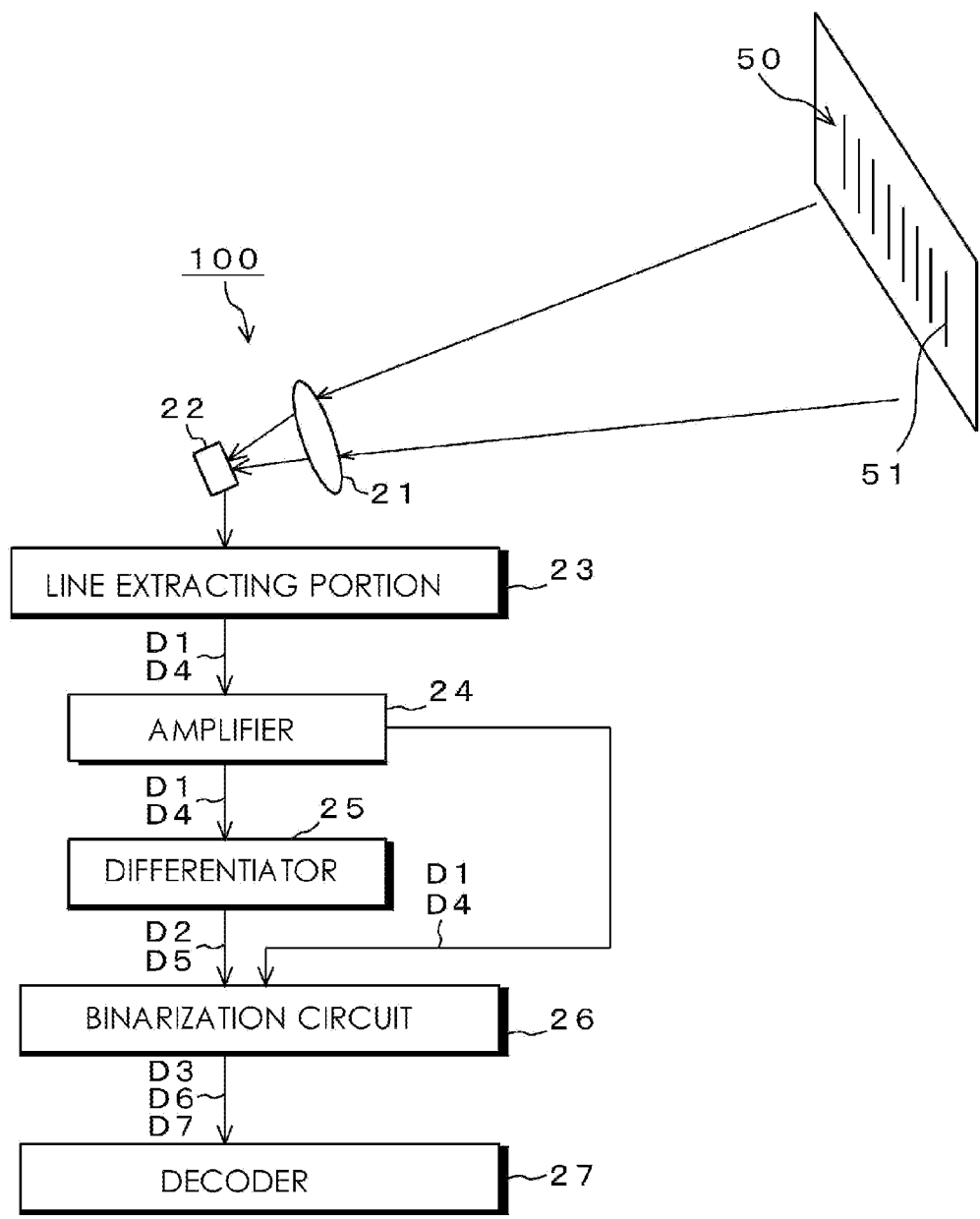
FIG. 1 is a block diagram of a code scanner 100 according to a first embodiment for showing a configuration example thereof.

As shown in FIG. 1, the code scanner 100 is provided with an imaging lens 21, an image sensing device 22, a line extracting portion 23, an amplifier 24, a differentiator 25, a binarization circuit 26 and a decoder 27. The code scanner 100 makes light reflected by the code image 51 formed on the object 50 to be read incident on the imaging lens 21 to perform condensation of light and makes it image-form on the image sensing device 22 such as CCD and CMOS.

The image sensing device 22 is one example of the read signal producing portion, performs photoelectric conversion on the reflected light according to the intensity of the reflected light, produces read signal D1, D4 which is analog electric signal and outputs the produced read signal D1, D4 to the line extracting portion 23.

The image sensing device 22 is connected to the line extracting portion 23. The line extracting portion 23 extracts every one line from the read signal D1, D4 output from the image sensing device 22 to output it to the amplifier 24.

The line extracting portion 23 is connected to the amplifier 24. The amplifier 24 amplifies signal levels of the read signal D1, D4 output from the line extracting portion 23 up to a desired level to output it to the differentiator 25 and the binarization circuit 26.

The amplifier 24 is connected to the differentiator 25 and the binarization circuit 26. The differentiator 25 is one example of derivative signal producing portion, differentiates the read signal D1, D4 amplified by the amplifier 24 to produce derivative signal D2, D5 and outputs it to the binarization circuit 26.

The differentiator 25 is connected to the binarization circuit 26. The binarization circuit 26 is one example of binarization portion and receives the read signal D1, D4 output from the amplifier 24 and the derivative signal D2, D5 output from the differentiator 25. The binarization circuit 26 detects inflection points of intensity of the reflected light in the read signal D1, D4 by detecting extreme values of the derivative signal D2, D5 from the received derivative signal D2, D5. The extreme values of the derivative signal D2, D5 correspond to positions in which there are the inflection points of intensity of the reflected light in the read signal D1, D4.

The binarization circuit 26 binarizes the read signal D1, D4 output from the amplifier 24 on the basis of the detected inflection points to produce the binarization signals D3, D6 having information on width lengths between the inflection points. The binarization circuit 26 outputs the produced binarization signal D3, D6 to the decoder 27. Further, the binarization circuit 26 then detects peak levels, each of which is an extreme value of the intensity of the reflected light, the peak level corresponding to a width length between the inflection points, and outputs to the decoder 27 peak level information D7 which is information containing a value of the detected peak level (for example, a value (9800) of signal level of peak level C1 shown in FIG. 2, which will be described later) and positions of the peak levels (for example, a position (350) of the peak level C1 shown in FIG. 2).

The binarization circuit 26 is connected to the decoder 27. The decoder 27 is one example of decoding portion, and extracts width length between the inflection points and values of the peak levels from the binarization signal D3, D6 output from the binarization circuit 26 and the peak level information D7. The decoder 27 aggregates the width length and the values of the peak levels thus extracted and sets normal value regions each relating to the width lengths and the peak levels based on the aggregation result. The decoder 27 then deletes the width lengths and the peak levels outside the set normal value regions as noises. The normal value region is a region such that, for example, if the aggregation result of the width lengths and the values of the peak levels are distributed according to a normal distribution, the width lengths and the values of the peak levels which are close to this distribution should be set to be normal and the width lengths and the values of the peak levels which are away from this distribution should be set to be abnormal.

The decoder 27 obtains a difference between the peak levels and sets threshold values each for decoding the read signal D1, D4 from the obtained differences between the peak levels. For example, the decoder 27 determines whether or not the difference between the peal levels is smaller than a predetermined value, and when the determined result is smaller than the predetermined value, it sets the threshold values from the width lengths or when the determined result is not smaller than the predetermined value, it sets the threshold values from the peak levels. It is to be noted that the decoder 27 may obtain frequency distribution of the detected peak levels to set the threshold values for decoding the read signal D1, D4 based on the obtained frequency distribution.

After the threshold values have been set, the decoder 27 decodes the read signal D1, D4 based on the threshold values, plots of the width lengths and peak levels inside the normal value region (plots shown in FIG. 5, which will be described later) and the positions of the peak levels in the peal level information D7 so that information contained in the code image 51 can be decoded.

[Processing Examples in Binarization Circuit 26 and Decoder 27]

Figure 2:
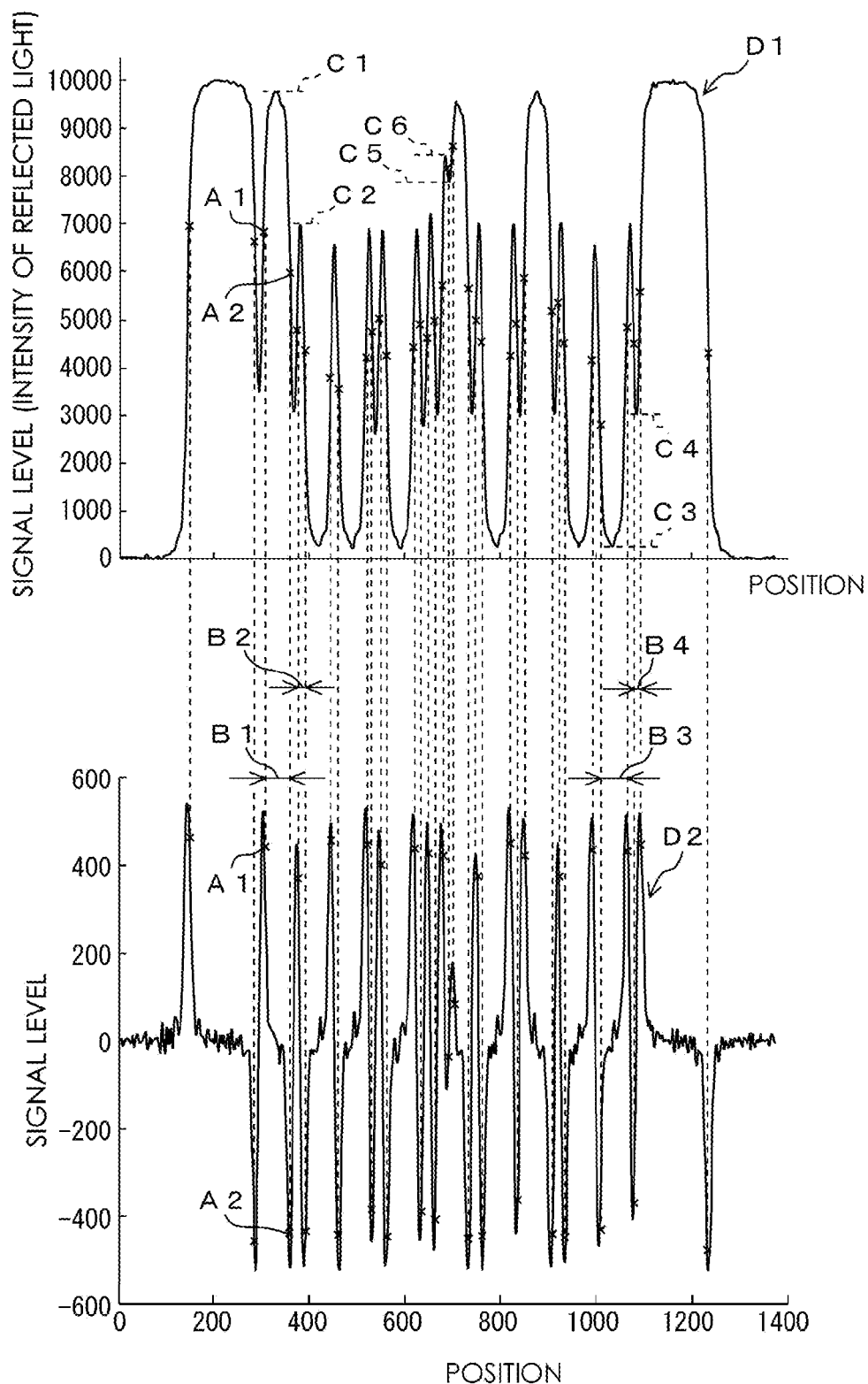
FIG. 2 is a diagram showing a processing example (No. 1) of a binarization circuit 26.

Next, the following will describe processing examples in the binarization circuit 26 and the decoder 27. A waveform shown in a top part of FIG. 2 shows a processing example of the read signal D1 by the binarization circuit 26 in which a vertical axis indicates a signal level (intensity of the reflected light) and a horizontal axis indicates position. A waveform shown in a bottom part of FIG. 2 shows a processing example of the derivative signal D2 by the binarization circuit 26 in which a vertical axis indicates the signal level and a horizontal axis indicates the position.

Figure 12:
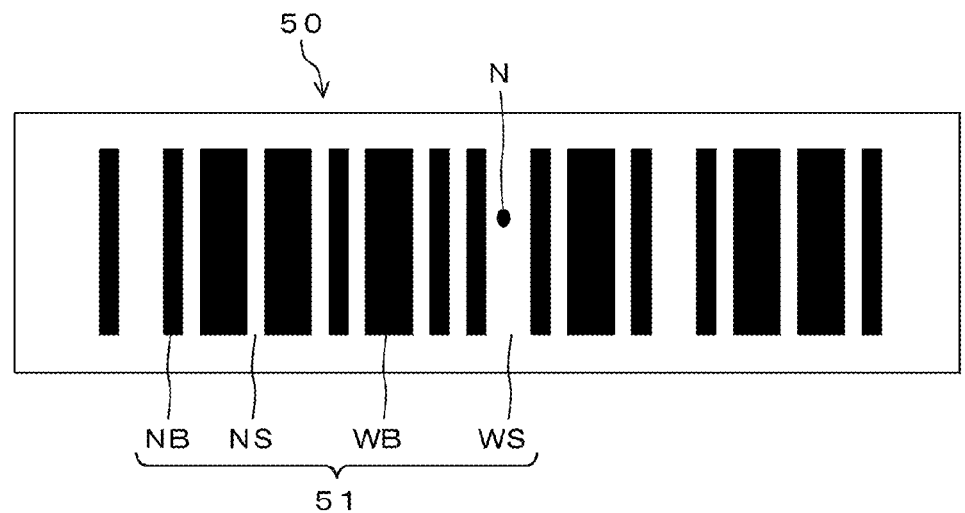
FIG. 12 is a diagram of a code image 51 for showing a configuration example thereof.
Figure 13:
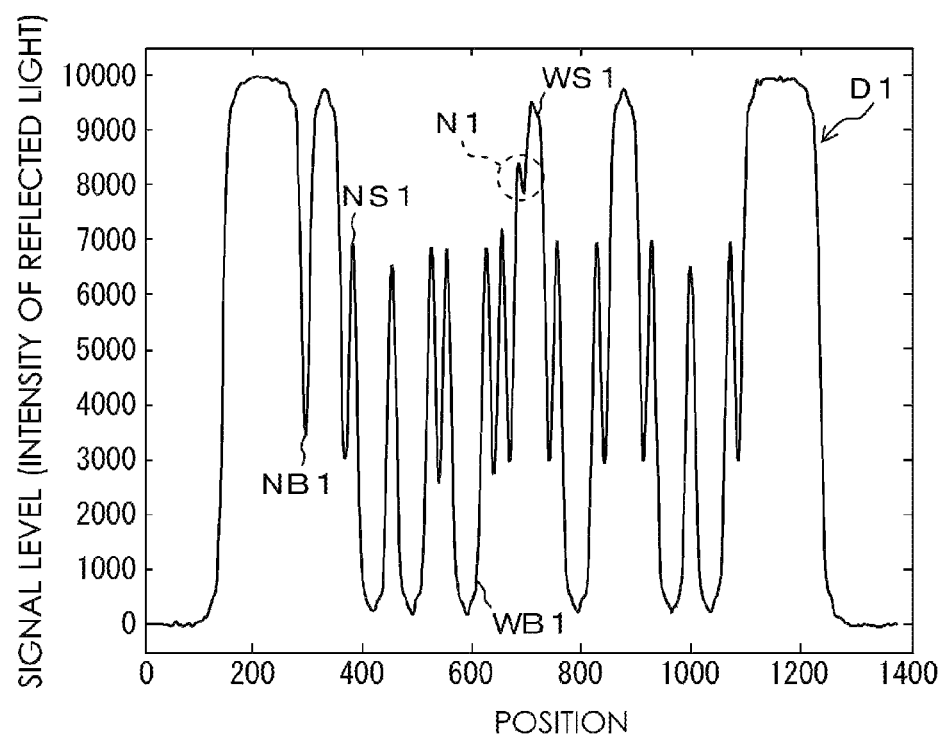
FIG. 13 is a diagram showing a waveform of a read signal D1.
Figure 14:
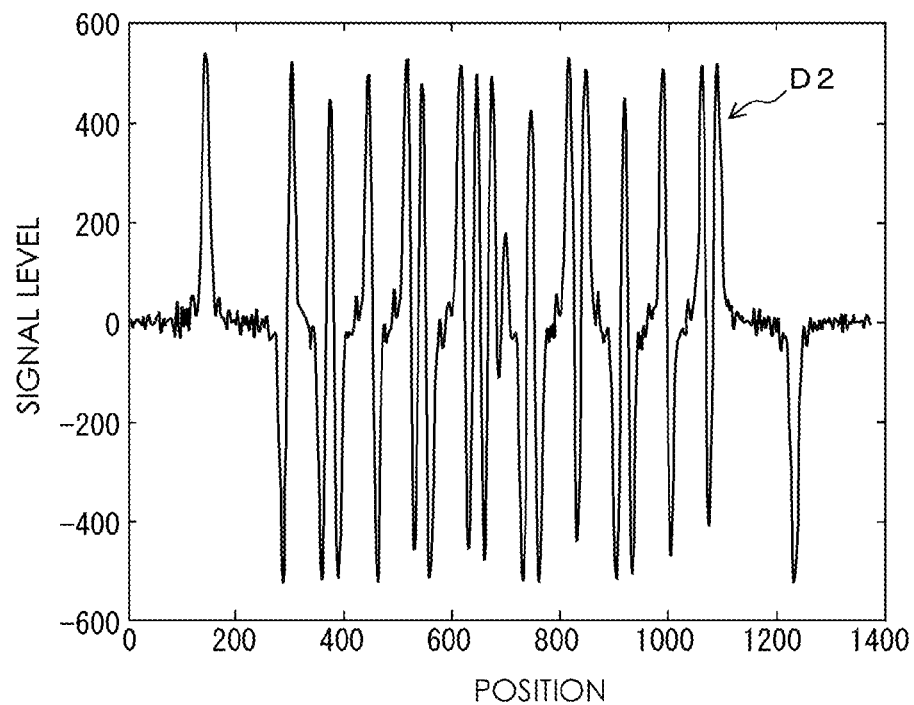
FIG. 14 is a diagram showing a waveform of a derivative signal D2.
Figure 15:
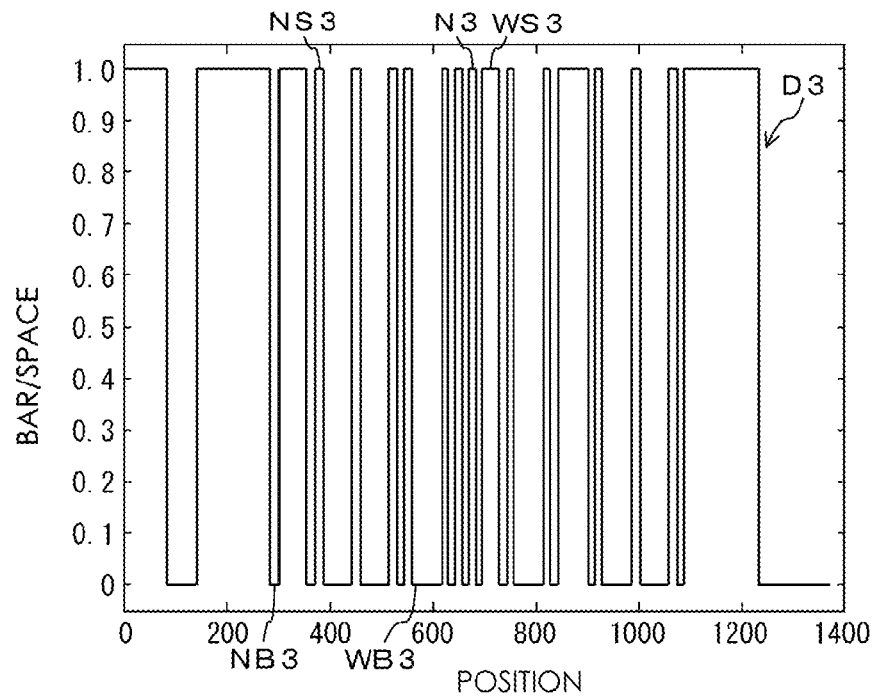
FIG. 15 is a diagram showing a waveform of a binarization signal D3.

In this example, it is assumed that the code image 51 shown in FIG. 12 is read; the read signal D1 shown in FIG. 13 is produced by the image sensing device 22, the line extracting portion 23 and the amplifier 24; and the derivative signal D2 shown in FIG. 14 is produced by the differentiator 25 based on this read signal D1. In other words, the waveform shown in the top part of FIG. 2 is identical with the read signal D1 shown in FIG. 13 and the waveform shown in the bottom part of FIG. 2 is identical with the derivative signal D2 shown in FIG. 14.

As shown in FIG. 2, the binarization circuit 26 detects the inflection points A1, A2, which correspond to the extreme values of the derivative signal D2, of the intensity of the reflected light in the read signal D1 (In other words, the extreme values of the derivative signal D2 correspond to the inflection points of the read signal D1). The binarization circuit 26 then detects peak level C1 which corresponds to the width length B1 between the inflection points based on the detected inflection points A1, A2, and is the extreme value of the intensity of the reflected light. By the way, width lengths B2, B3, B4 respectively correspond to the peak levels C2, C3, C4. The peak levels C1, C2, C3, C4 respectively correspond to the wide space WS, the narrow space NS, the wide bar WB and the narrow bar NB, which are shown in FIG. 12.

In the waveform shown in the top part of FIG. 2, the stain N shown in FIG. 12 appears as the peak levels C5, C6. The width lengths B1, B2, B3, B4 are fixed so as to correspond to the widths of bar and space in the code image 51.

Figure 3:
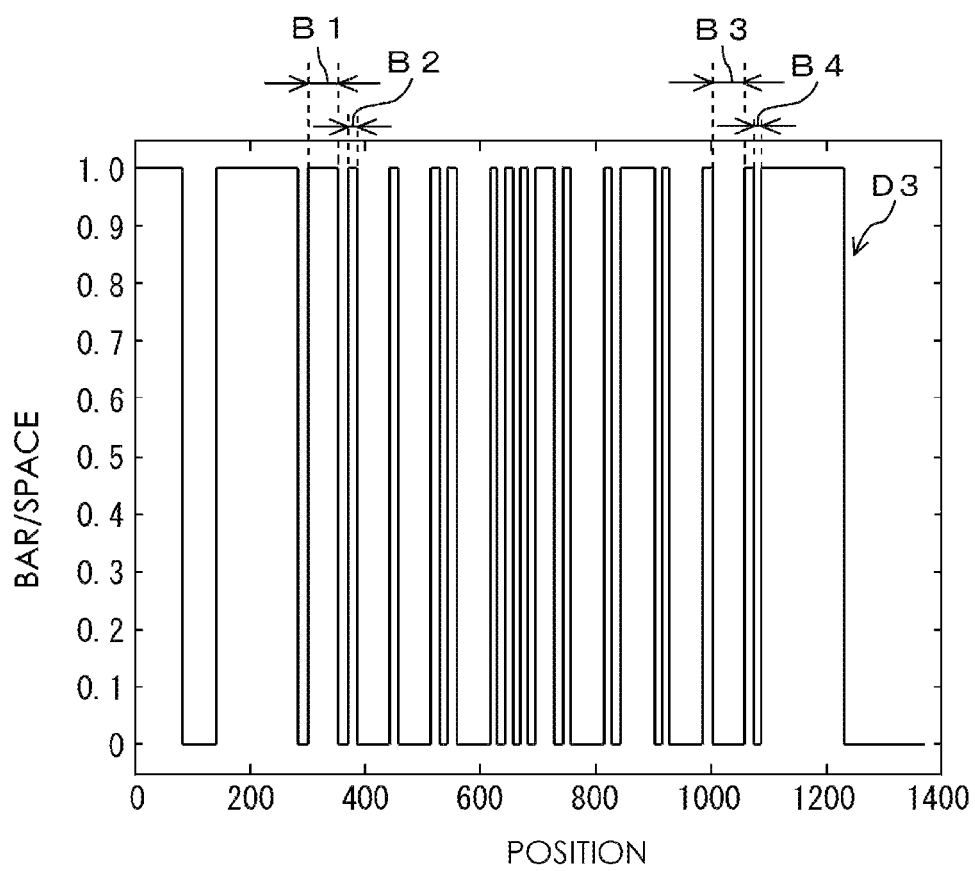
FIG. 3 is a diagram showing the processing example (No. 2) of the binarization circuit 26.

FIG. 3 is a diagram showing a processing example of the binarization signal D3 by the binarization circuit 26 in which a vertical axis indicates bar/space (the bar in a case of "0" and the space in a case of "1") and a horizontal axis indicates position. The binarization circuit 26 produces the binarization signal D3 by using the detected inflection points A1, A2 of the derivative signal D2 in the waveform shown in the bottom part of FIG. 2 as standing points thereof or falling points thereof. As shown in FIG. 3, the width lengths B1, B2, B3, B4 are fixed on the basis of this binarization signal D3.

Figure 4:
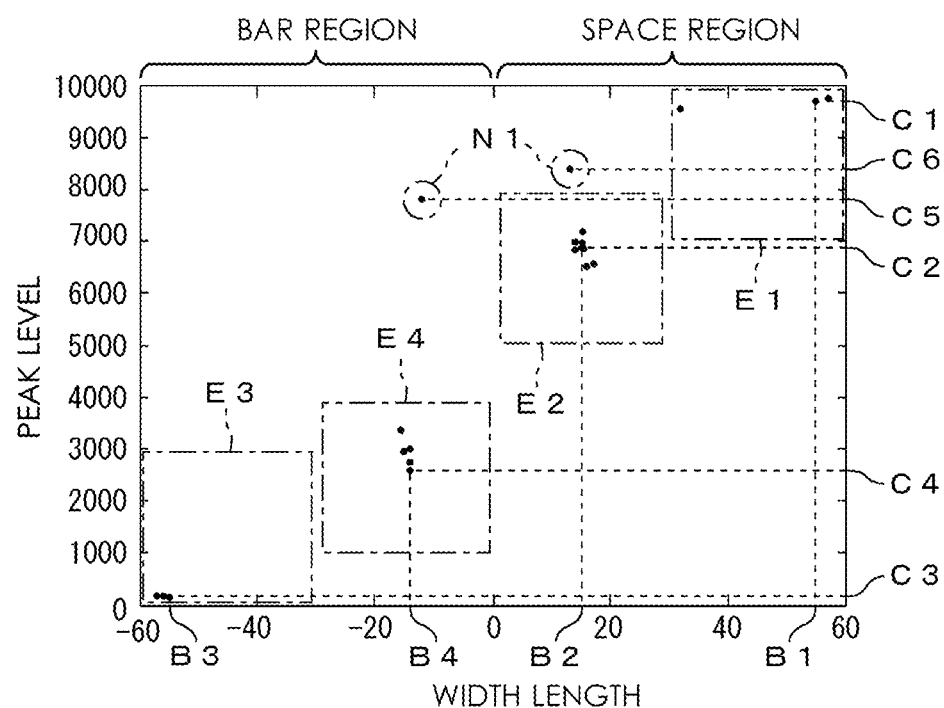
FIG. 4 is a diagram showing a processing example (No. 1) of a decoder 27.

FIG. 4 is a diagram showing a frequency distribution example in which peak levels and width lengths produced by the binarization circuit 26 are plotted when a vertical axis indicates peak level and a horizontal axis indicates width length. As shown in FIG. 4, on the width length of the horizontal axis, positive numbers are fixed as a space region in which the wide space WS and the narrow space NS exist while negative numbers are fixed as a bar region in which the wide bar WB and the narrow bar NB exist. The decoder 27 aggregates the peak levels C1 through C4 shown in the waveform shown in the top part of FIG. 2 and the width lengths B1 through B4 produced in FIG. 3 to set normal value regions E1 through E4, which are shown by alternate long and short dash lines, relating to the peak levels C1 through C4 and the width lengths B1 through B4 based on the aggregation result thereof.

The normal value region E1 is a region relating to the wide space WS and is set by aggregating the width length B1 and the peak level C1 and assuming that for example, the aggregation result is distributed according to a normal distribution. The normal value region E2 is a region relating to the narrow space NS and is set by aggregating the width length B2 and the peak level C2 and assuming that for example, the aggregation result is distributed according to a normal distribution. The normal value region E3 is a region relating to the wide bar WB and is set by aggregating the width length B3 and the peak level C3 and assuming that for example, the aggregation result is distributed according to a normal distribution. The normal value region E4 is a region relating to the narrow bar NB and is set by aggregating the width length B4 and the peak level C4 and assuming that for example, the aggregation result is distributed according to a normal distribution.

When the width length(s) and the peak level(s) exist outside the set normal value regions E1 through E4, the decoder 27 deletes the width length(s) and the peak level(s) as noise. Namely, since, in FIG. 4, the peak levels C5, C6 exist outside the set normal value regions E1 through E4, the decoder 27 deletes the noise N1 corresponding to the peak levels C5, C6 (or does not decode the noise N1).

Figure 5:
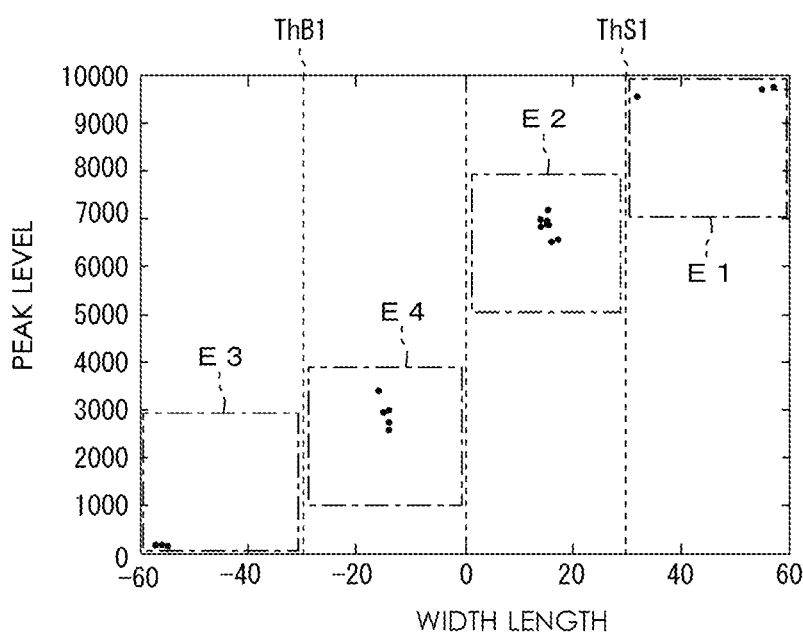
FIG. 5 is a diagram showing the processing example (No. 2) of the decoder 27.

FIG. 5 is a diagram showing a processing example in which the noise N is deleted from the frequency distribution example shown in FIG. 4 and threshold values ThB1, ThS1 are set. The threshold value ThB1 is a boundary value between the wide bar WB and the narrow bar NB and if value of the width length is smaller than the threshold value ThB1, the bar corresponding to the plot thereof is determined as the wide bar WB while if value of the width length is larger than the threshold value ThB1, the bar corresponding to the plot thereof is determined as the narrow bar NB. Further, the threshold value ThS1 is a boundary value between the wide space WS and the narrow space NS and if value of the width length is smaller than the threshold value ThS1, the space corresponding to the plot thereof is determined as the narrow space NS while if value of the width length is larger than the threshold value ThS1, the space corresponding to the plot thereof is determined as the wide space WS.

As shown in FIG. 5, the decoder 27 sets the threshold value ThB1 in relation to the width length between the normal value region E3 and the normal value region E4. The decoder 27 also sets the threshold value ThS1 in relation to the width length between the normal value region E1 and the normal value region E2. Namely, in FIG. 5, the decoder 27 sets the threshold values ThB1, ThS1 based on the width lengths.

It is to be noted that the threshold values ThB1, ThS1 may be set based on the difference between the respective width lengths B1 through B4 (for example, the threshold value ThS1 may be obtained from (B1+B2)/2 and the threshold value ThB1 may be obtained from (B3+B4)/2).

The decoder 27 decodes the read signal D1 using the threshold values ThB1, ThS1 set on the basis of the frequency distribution shown in FIG. 5 (or the difference between the width lengths B1 through B4).

Thus, in the code scanner 100 according to this invention, even when the object 50 to be read is spotted with the stain N or printing quality thereof is inferior, it is possible to decode the read signal D1 of the code image 51 surely because the threshold values ThB1, ThS1 for decoding the read signal D1 are set.

Next, the following will describe a binarization processing example of the code scanner when the code scanner and the object 50 to be read are away from each other by a distance more than a predetermined distance (a focal distance) and its defocus state occurs. Here, the defocus state is referred to as an out-of-focus state where a light-receiving surface of the code scanner deviates from an image forming surface of a lens to an optical axis direction.

Figure 6:
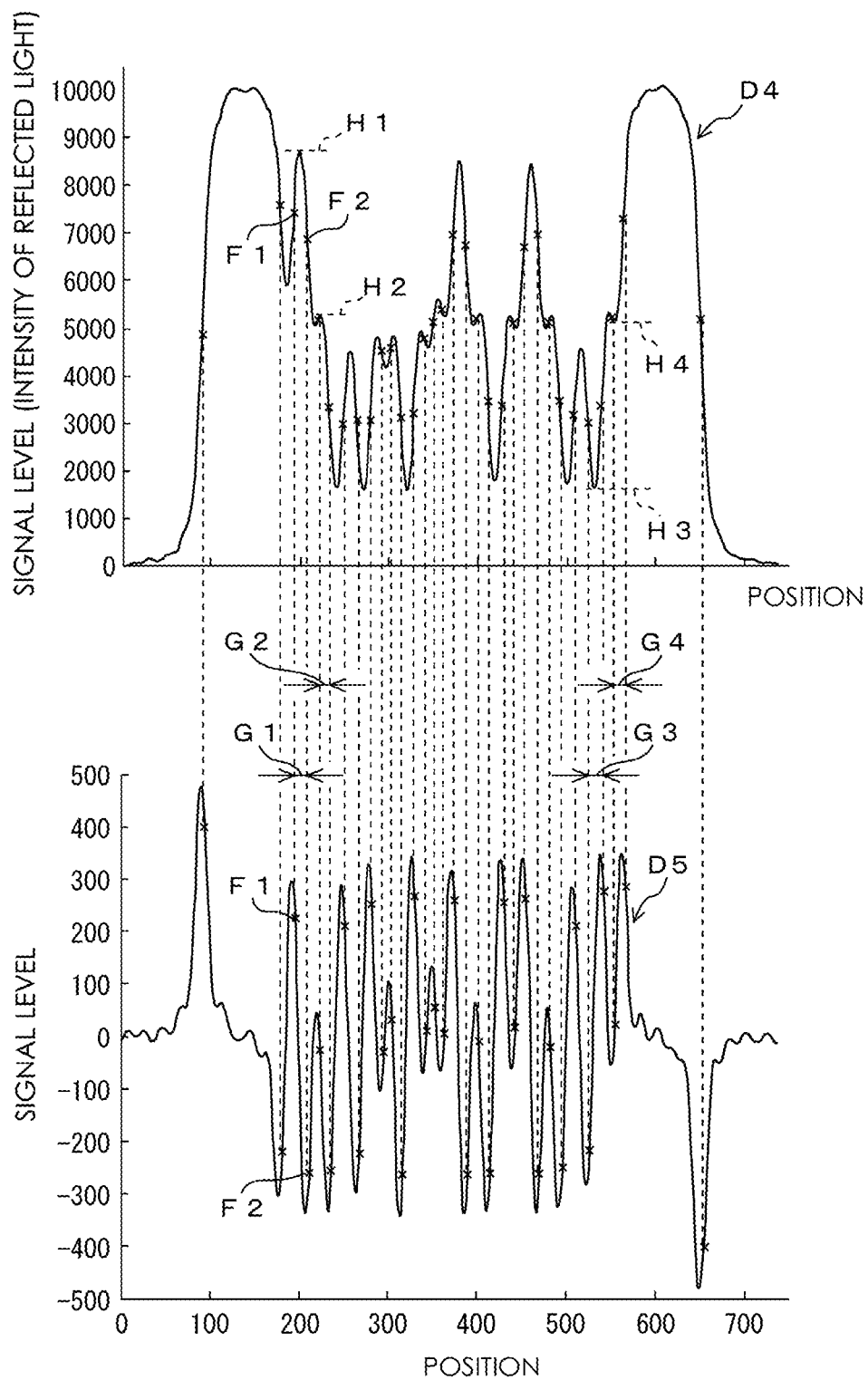
FIG. 6 is a diagram showing the processing example (No. 3) of the binarization circuit 26.

A waveform shown in a top part of FIG. 6 shows a processing example of the read signal D4 by the binarization circuit 26 in which a vertical axis indicates a signal level (intensity of the reflected light) and a horizontal axis indicates position. A waveform shown in a bottom part of FIG. 6 shows a processing example of the derivative signal D5 by the binarization circuit 26 in which a vertical axis indicates the signal level and a horizontal axis indicates the position.

Figure 16:
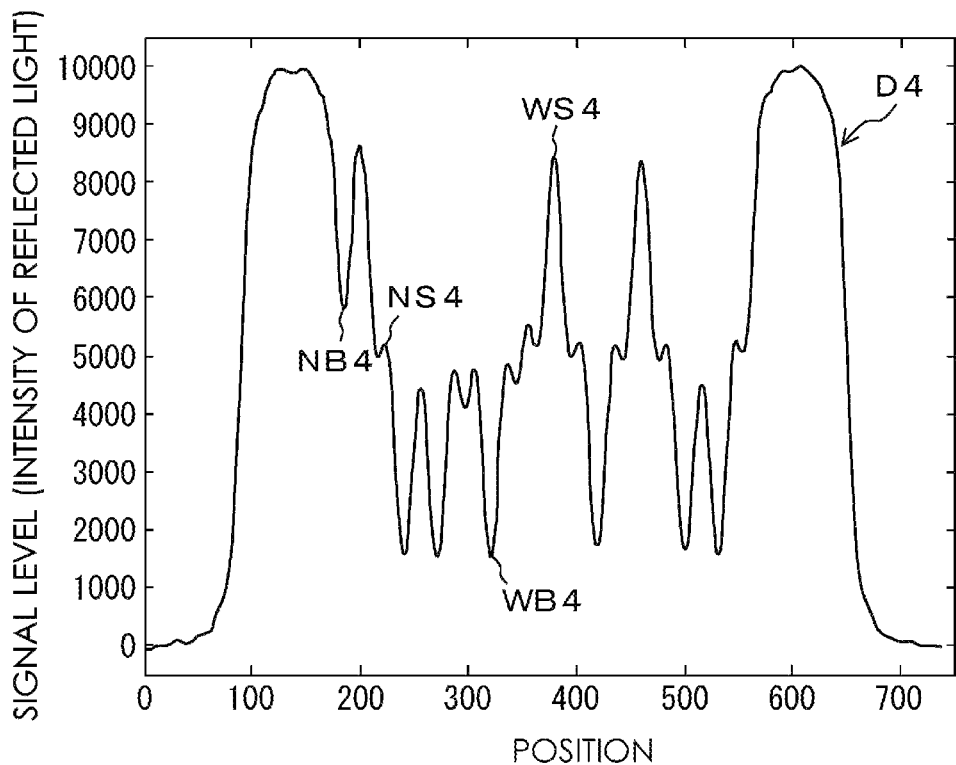
FIG. 16 is a diagram showing a waveform of a read signal D4.
Figure 17:
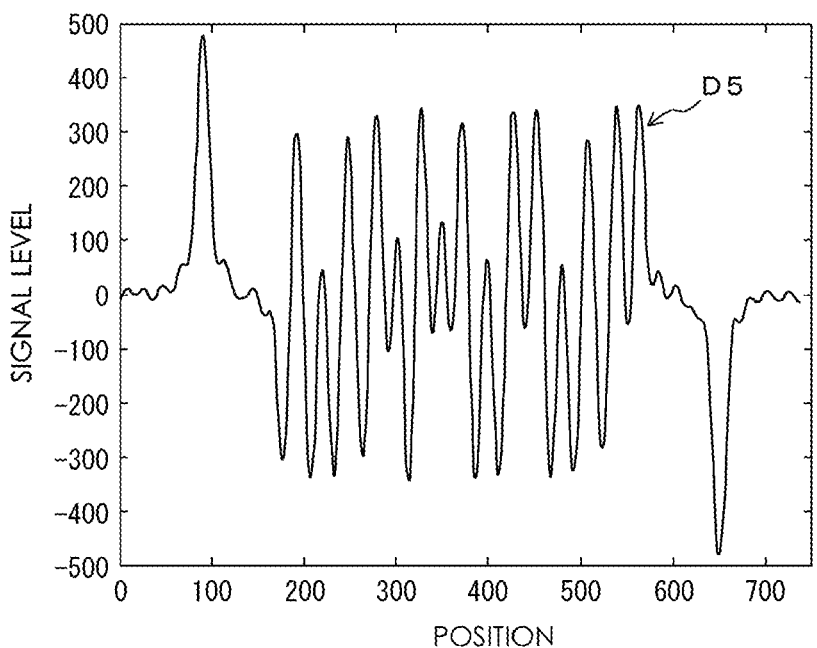
FIG. 17 is a diagram showing a waveform of a derivative signal D5.
Figure 18:
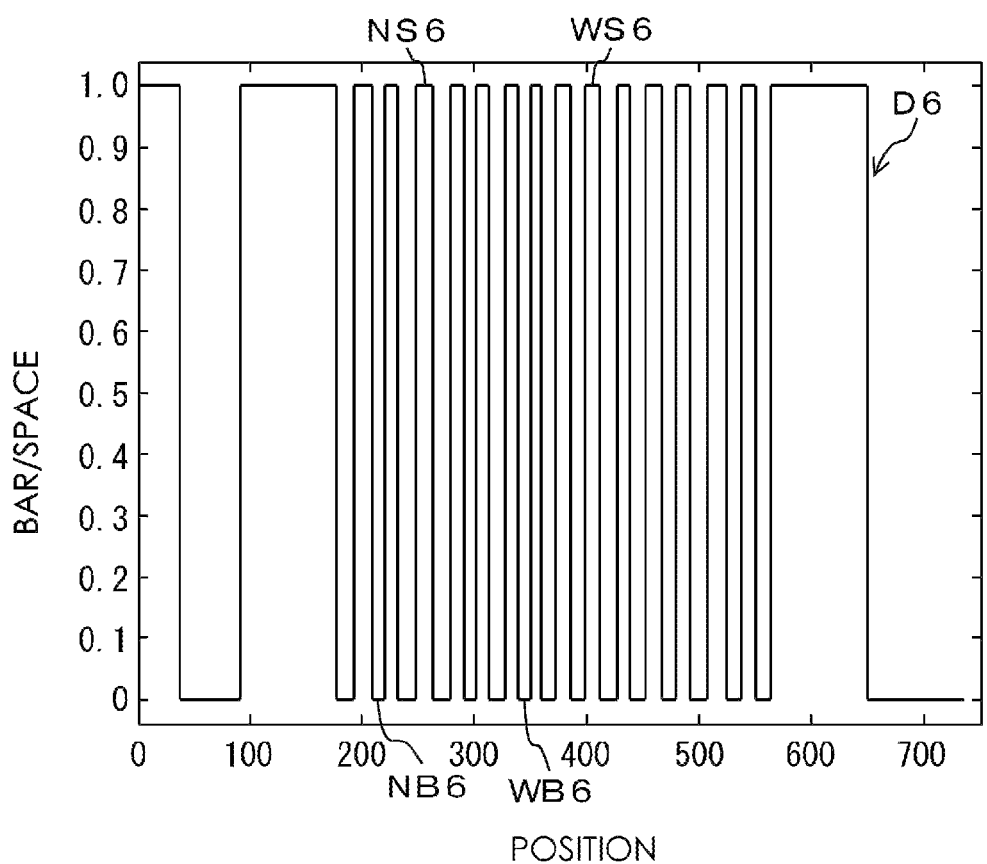
FIG. 18 is a diagram showing a waveform of a binarization signal D6.

In this example, it is assumed that the code image 51 shown in FIG. 12 is read in its defocus state; the read signal D4 shown in FIG. 16 is produced by the image sensing device 22, the line extracting portion 23 and the amplifier 24; and the derivative signal D5 shown in FIG. 17 is produced by the differentiator 25 based on this read signal D4. In other words, the waveform shown in the top part of FIG. 6 is identical with the read signal D4 shown in FIG. 16 and the waveform shown in the bottom part of FIG. 6 is identical with the derivative signal D5 shown in FIG. 17.

Figure 11:
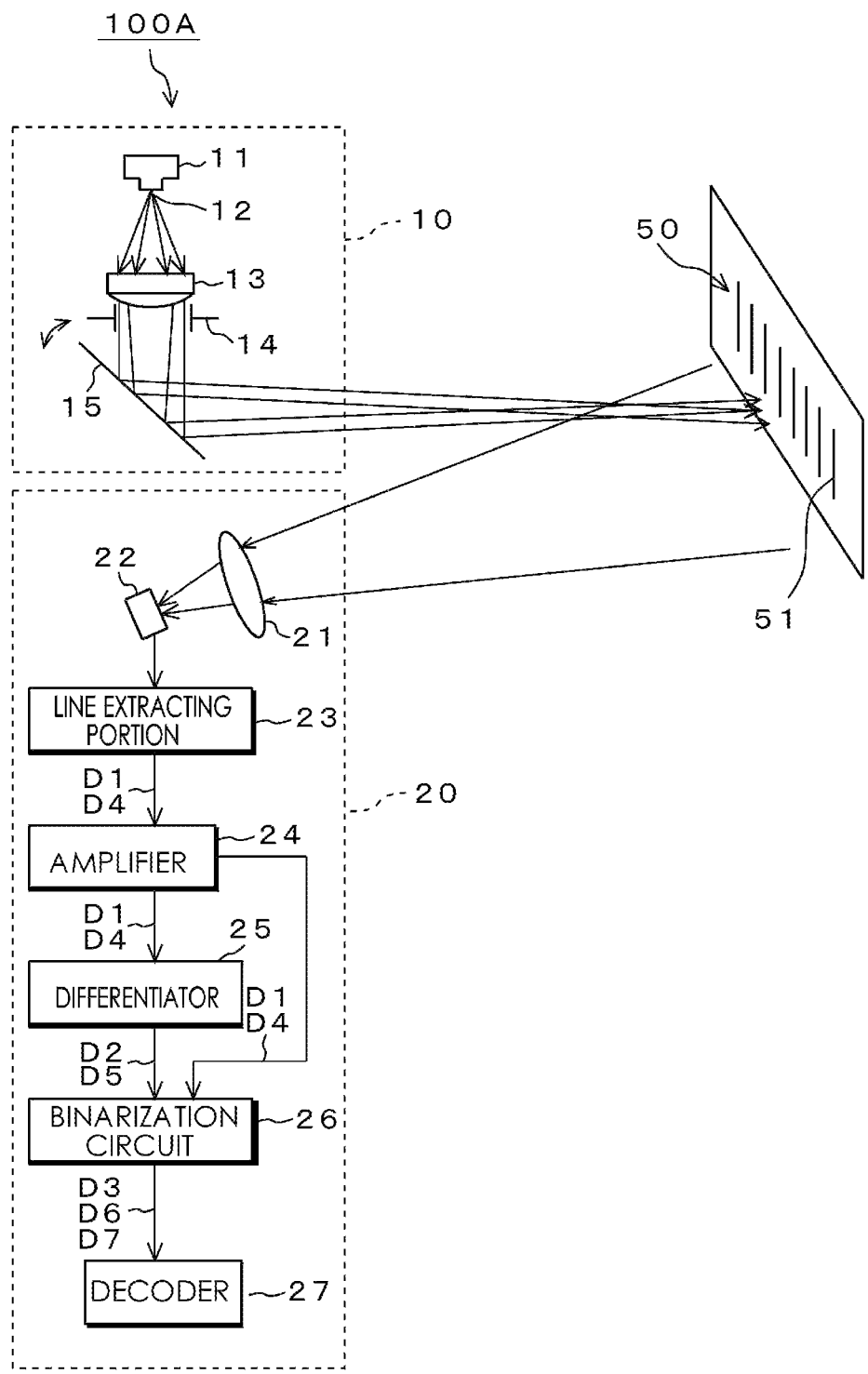
FIG. 11 is a block diagram of a code scanner 100A according to a second embodiment for showing a configuration example thereof.

As shown in FIG. 6, the binarization circuit 26 detects the inflection points F1, F2, which correspond to the extreme values of the derivative signal D5, of the intensity of the reflected light in the read signal D4 (In other words, the extreme values of the derivative signal D5 correspond to the inflection points of the read signal D4). The binarization circuit 26 then detects peak level H1 which corresponds to width length G1 between the inflection points based on the detected inflection points F1, F2, and is the extreme value of the intensity of the reflected light. By the way, width lengths G2, G3, G4 respectively correspond to the peak levels H2, H3, H4. The peak levels H1, H2, H3, H4 respectively correspond to the wide space WS, the narrow space NS, the wide bar WB and the narrow bar NB, which are shown in FIG. 11.

In the waveform shown in the top part of FIG. 6, the peak levels C5, C6 which have been shown in the waveform of the top part of FIG. 2 and are depended on the strain shown in FIG. 12 do not appear because the code image 51 is read in its defocus state. The width lengths G1, G2, G3, G4, however, are almost the same length as each other because the code image 51 is read in its defocus state.

Figure 7:
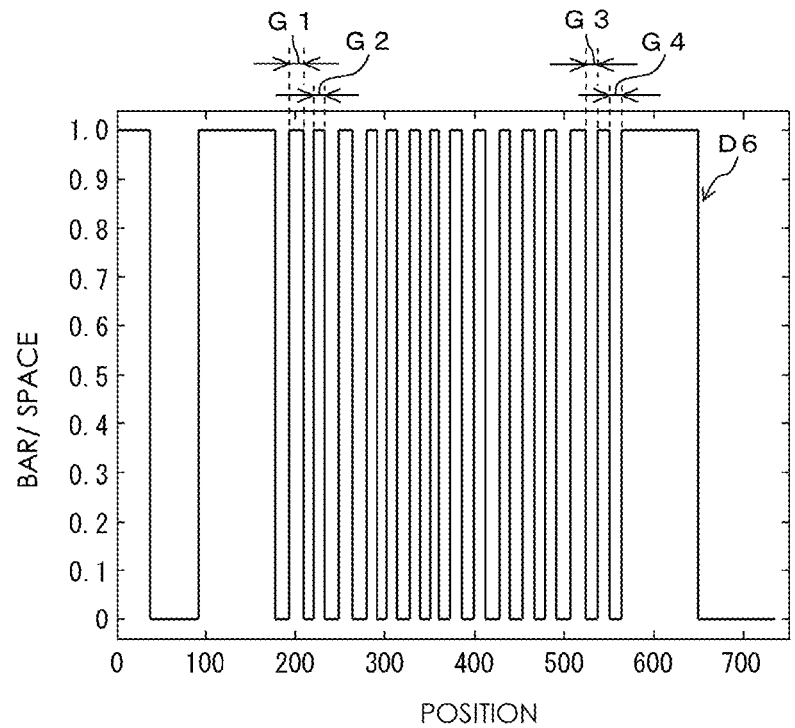
FIG. 7 is a diagram showing the processing example (No. 4) of the binarization circuit 26.

FIG. 7 is a diagram showing a processing example of the binarization signal D6 by the binarization circuit 26 in which a vertical axis indicates bar/space (the bar in a case of "0" and the space in a case of "1") and a horizontal axis indicates position. The binarization circuit 26 produces the binarization signal D6 by using the detected inflection points F1, F2 of the derivative signal D5 in the waveform shown in the bottom part of FIG. 6 as standing points thereof or falling points thereof. As shown in FIG. 7, the width lengths G1 through G4 are fixed on the basis of this binarization signal D6.

Figure 8:
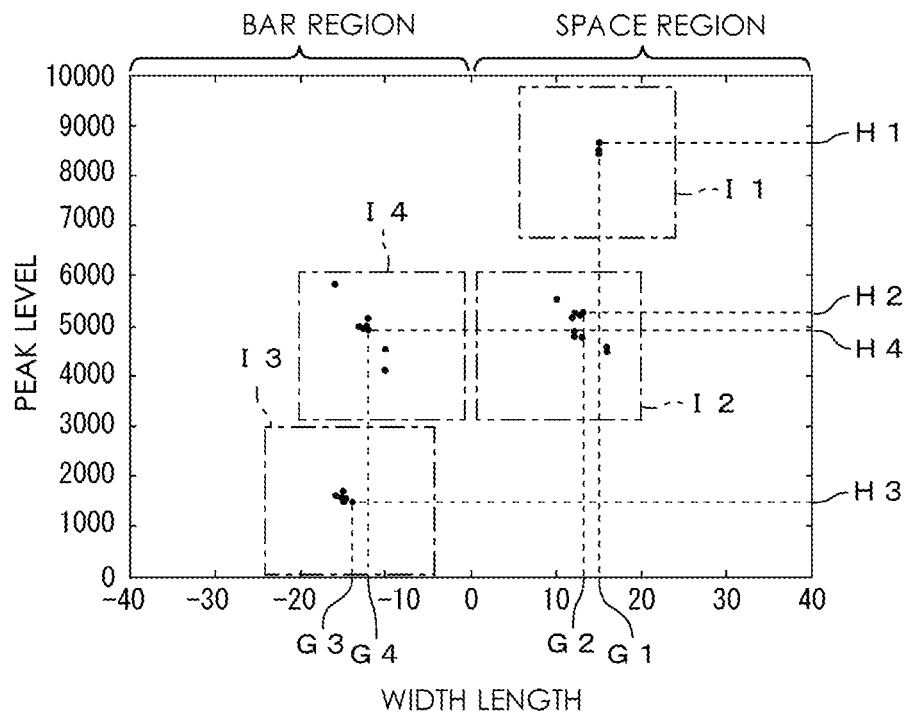
FIG. 8 is a diagram showing the processing example (No. 3) of the decoder 27.

FIG. 8 is a diagram showing a frequency distribution example in which peak levels and width lengths produced by the binarization circuit 26 are plotted when a vertical axis indicates peak level and a horizontal axis indicates width length. As shown in FIG. 8, on the width length of the horizontal axis, positive numbers are fixed as a space region in which the wide space WS and the narrow space NS exist while negative numbers are fixed as a bar region in which the wide bar WB and the narrow bar NB exist. The decoder 27 aggregates the peak levels H1 through H4 shown in the waveform shown in the top part of FIG. 6 and the width lengths G1 through G4 produced in FIG. 7 to set normal value regions 11 through 14, which are shown by alternate long and short dash lines, relating to the peak levels H1 through H4 and the width lengths G1 through G4 based on the aggregation result thereof.

The normal value region 11 is a region relating to the wide space WS and is set by aggregating the width length G1 and the peak level H1 and assuming that for example, the aggregation result is distributed according to a normal distribution. The normal value region 12 is a region relating to the narrow space NS and is set by aggregating the width length G2 and the peak level H2 and assuming that for example, the aggregation result is distributed according to a normal distribution. The normal value region 13 is a region relating to the wide bar WB and is set by aggregating the width length G3 and the peak level H3 and assuming that for example, the aggregation result is distributed according to a normal distribution. The normal value region 14 is a region relating to the narrow bar NB and is set by aggregating the width length G4 and the peak level H4 and assuming that for example, the aggregation result is distributed according to a normal distribution.

When the width length(s) and the peak level(s) exist outside the normal value regions 11 through 14, the decoder 27 deletes the width length(s) and the peak level(s) as noise. In this example, however, since any noise based on the stain N does not read from the code image 51, such processing is not carried out.

Figure 9:
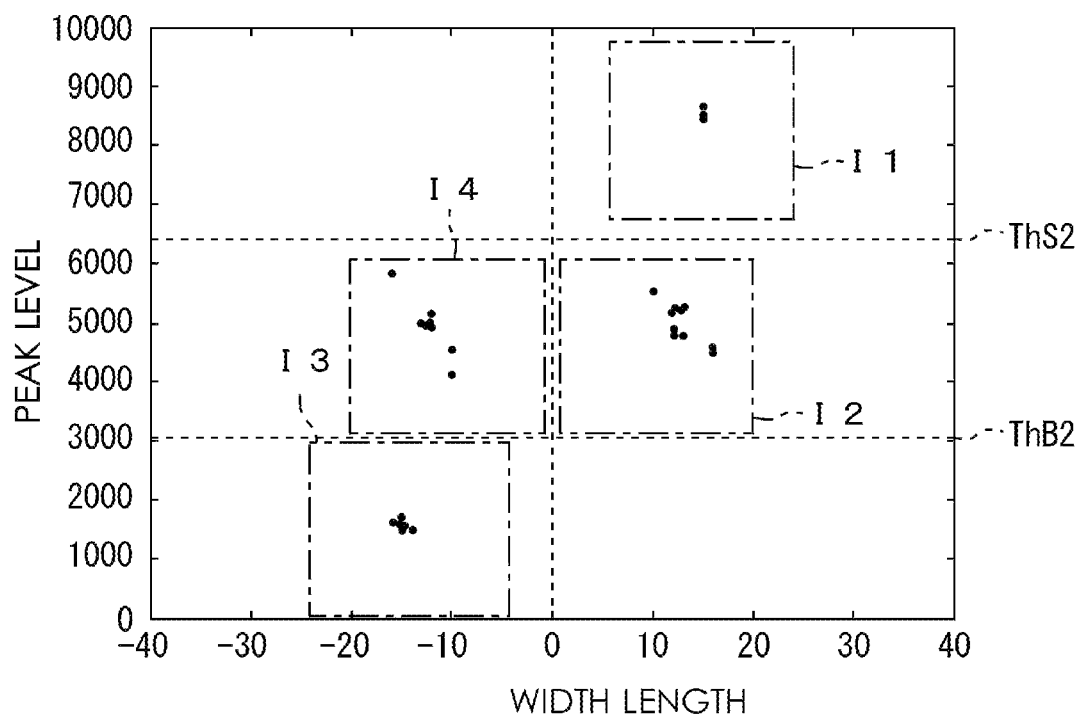
FIG. 9 is a diagram showing the processing example (No. 4) of the decoder 27.

FIG. 9 is a diagram showing a processing example in which threshold values ThB2, ThS2 are set from the frequency distribution example shown in FIG. 8. As shown in FIG. 9, there is any correlation between a value of the peak level and a width length of the bar or space. In other words, the larger the value of the peak level is, the width length of the bar or space becomes larger (corresponding to the wide bar WB or the wide space WS). The smaller the value of the peak level is, the width length of the bar or space becomes smaller (corresponding to the narrow bar NB or the narrow space NS).

The threshold value ThB2 is a boundary value between the wide bar WB and the narrow bar NB and if value of the peak level is smaller than the threshold value ThB2, the bar corresponding to the plot thereof is determined as the narrow bar NB while if value of the peak level is larger than the threshold value ThB2, the bar corresponding to the plot thereof is determined as the wide bar WB. The threshold value ThS2 is a boundary value between the wide space WS and the narrow space NS and if value of the peak level is smaller than the threshold value ThS2, the space corresponding to the plot thereof is determined as the narrow space NS while if value of the peak level is larger than the threshold value ThS2, the space corresponding to the plot thereof is determined as the wide space WS.

The decoder 27 sets the threshold value ThS2 in relation to the peak level between the normal value region I1 and the normal value region 12 which are shown in FIG. 9. The decoder 27 also sets the threshold value ThB2 in relation to the peak level between the normal value region 13 and the normal value region 14. Namely, in FIG. 9, the decoder 27 sets the threshold values ThB2, ThS2 based on the peak levels, not the width lengths as shown in FIG. 5. This is because when setting the threshold values based on the width lengths as shown in FIG. 5, the normal value region I1 and the normal value region 12 or the normal value region 13 and the normal value region 14 are overlapped in regard to the width length (as shown in FIG. 7, all of the width lengths are almost the same length as each other) so that the threshold values cannot be set.

It is to be noted that the threshold values ThB2, ThS2 may be set based on the difference between the respective peak levels H1 through H4 (for example, the threshold value ThS2 may be obtained from (H1+H2)/2 and the threshold value ThB2 may be obtained from (H3+H4)/2).

The decoder 27 decodes the read signal D4 using the threshold values ThB2, ThS2 set on the basis of the frequency distribution shown in FIG. 9 (or the difference between the peak levels H1 through H4).

Thus, in the code scanner according to this invention, even when the read signal D4 is produced while the code image 51 is read in its defocus state, it is possible to decode the signal without using any complicated algorithm or fast CPU because the threshold values ThB2, ThS2 for decoding the read signal D4 are set.

(Operation Example of Code Scanner 100)

Figure 10:
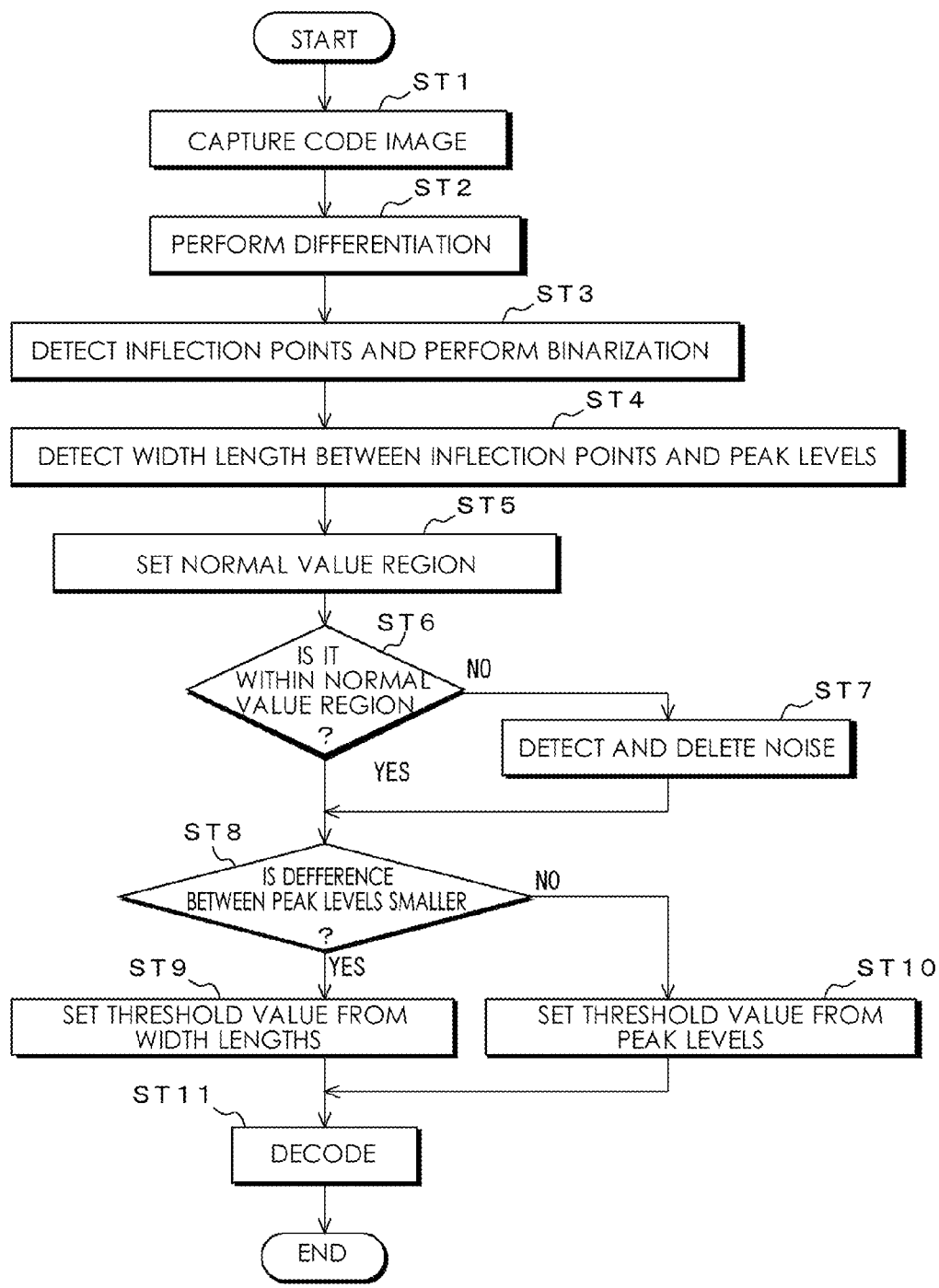
FIG. 10 is a flow chart for showing an operation example of the code scanner 100.

Next, the following will describe an operation example of the code scanner 100 using a flow chart therefor. As shown in FIG. 10, at a step ST1, the code scanner 100 receives light reflected by the code image 51 which is formed on the object 50 to be read. The code scanner 100 makes the imaging lens 21 perform condensation of the reflected light and makes it image-form on the image sensing device 22 to capture the code image 51 in the code scanner 100. On the code image 51 captured in the code scanner 100, photoelectric conversion is performed by the image sensing device 22 so that the read signal D1, D4 are produced. The read signal D1, D4 is extracted every one line by the line extracting portion 23 and signal level of the read signal D1, D4 is amplified to a predetermined level by the amplifier 24 (see FIGS. 13 and 16).

The operation goes to a step ST2 in which the differentiator 25 differentiates the read signal D1, D4 to produce the derivative signal D2, D5 (see FIGS. 14 and 17).

The operation goes to a step ST3 in which the binarization circuit 26 detects the extreme values of the derivative signal D2, D5 as the inflection points A1, A2, F1, F2 of the signal level in the read signal D1 (see FIGS. 2 and 6). The binarization circuit 26 then binarizes the read signal D1, D4 output from the amplifier 24 on the basis of the detected inflection points A1, A2, F1, F2 to produce the binarization signal D3, D6 (see FIGS. 3 and 7).

The operation goes to a step ST4 in which the binarization circuit 26 detects the width lengths B1 through B4, G1 through G4 between the inflection points from the produced binarization signal D3, D6 and detects the peak levels C1 through C4, H1 through H4, which correspond to the width lengths B1 through B4, G1 through G4 (see FIGS. 2 and 6). The binarization circuit 26 then produces the peak level information D7 which is information containing values of the detected peak levels C1 through C4, H1 through H4 and positions of the peak levels.

The operation goes to a step ST5 in which the decoder 27 extracts the width lengths B1 through B4, G1 through G4 and values of the peak levels C1 through C4, H1 through H4 from the binarization signal D3, D6 produced in the binarization circuit 26 and the peak level information D7. The decoder 27 then aggregates the width lengths B1 through B4, G1 through G4 and the peak levels C1 through C4, H1 through H4 thus extracted and sets normal value regions E1 through E4, I1 through I4 relating to the width lengths B1 through B4, G1 through G4 and the peak levels C1 through C4, H1 through H4 (see FIGS. 4 and 7) based on the aggregation result thereof.

The operation goes to a step ST6 in which the decoder 27 determines whether or not the width lengths B1 through B4, G1 through G4 and the peak levels C1 through C4, H1 through H4 exist within the set normal value regions E1 through E4, I1 through I4. If the width lengths B1 through B4, G1 through G4 and the peak levels C1 through C4, H1 through H4 exist within the set normal value regions E1 through E4, I1 through I4, the operation goes to a step ST8 and if not, the operation goes to a step ST8.

At the step ST7, the decoder 27 deletes the width lengths and the peak levels outside the normal value regions E1 through E4, I1 through I4 as noise. For example, the peak levels C5, C6 shown in FIG. 3 are noise N1.

At the step ST8, the decoder 27 determines whether or not the difference between the peal levels C1 through C4, H1 through H4 is smaller than a predetermined value which has been previously stored. If the difference between the peal levels C1 through C4, H1 through H4 is smaller than the predetermined value, the operation goes to a step ST9 and if the difference between the peal levels C1 through C4, H1 through H4 is not smaller than the predetermined value, the operation goes to a step ST10.

For example, when paying attention to the peak levels C1 through C4 shown in FIG. 4, the difference between the peak level C1 and the peak level C2 is small and the difference between the peak level C3 and the peak level C4 is also small. In this case, the operation goes to the step ST9. When paying attention to the peak levels H1 through H4 shown in FIG. 8, the difference between the peak level H1 and the peak level H2 is large and the difference between the peak level H3 and the peak level H4 is also large. In this case, the operation goes to the step ST10.

At the step ST9, the decoder 27 sets threshold values based on the width lengths B1 through B4, G1 through G4. For example, in FIG. 5, the decoder 27 sets the threshold value ThS1 between the normal value region E1 containing the width length B1 and the normal value region E2 containing the width length B2 and sets the threshold value ThB1 between the normal value region E3 containing the width length B3 and the normal value region E4 containing the width length B4. If the threshold values ThB1, THS1 are set, then the operation goes to a step ST11.

At the step ST10, the decoder 27 sets threshold values based on the peal levels C1 through C4, H1 through H4. For example, in FIG. 9, the decoder 27 sets the threshold value ThS2 between the normal value region I1 containing the peak level H1 and the normal value region 12 containing the peak level H2 and sets the threshold value ThB2 between the normal value region 13 containing the peak level H3 and the normal value region 14 containing the peak level H4. If the threshold values ThB2, THS2 are set, then the operation goes to the step ST11.

At the step ST11, the decoder 27 decodes information on the code image 51 (the read signal D1, D4) based on the set threshold values ThB1, ThS1, ThB2, ThS2, plots of the width lengths and peak levels inside the normal value regions and the positions of the peak levels in the peal level information D7.

Thus, in the code scanner 100 according to the first embodiment, the photoelectric conversion is performed on the light reflected by the code image 51, the read signal D1, D4 indicating intensity of the reflected light is produced, and the produced read signal D1, D4 is differentiated to produce the derivative signal D2, D5. On the assumption of this, the inflection points A1, A2, F1, F2 of intensity of the reflected light in the read signal D1, D2 are detected from the produced derivative signal D2, D5 and the peak levels C1 through C4, H1 through H4, each of which is an extreme value of the intensity of the reflected light, the peak levels corresponding to the width lengths B1 through B4, G1 through G4 between the detected inflection points, are detected. The difference between the detected peak levels C1 through C4, H1 through H4 is then obtained and the threshold values ThB1, ThS1, ThB2, ThS2 for decoding the read signal D1, D4 are set from the obtained difference between the peak levels C1 through C4, H1 through H4.

Accordingly, it is possible to decode the read signal without using any complicated algorithm or fast CPU even when the read signal D1, D4 is based on the code image 51 which is spotted with a stain N or printing quality of which is inferior or even when the read signal D1, D4 is read in its defocus state because the threshold values ThB1, ThB1, ThB2, ThS2 for decoding the read signal D1, D4 are set. As a result thereof, it is possible to provide the decoding method and the code scanner (the decoding-processing apparatus) by which a read performance is improved.

Further, although the code image 51 has been described by the barcode as one example in this embodiment, the invention is not limited thereto: The decoding method according to this invention may be available even for a two-dimensional code. In this case, an image of one frame of the two-dimensional code is shot by the code scanner shown in FIG. 1 and the shot image of the two-dimensional code is scanned every line on a horizontal direction and a vertical direction so that the processing shown in FIG. 10 is carried out. By adding up the data binarized every line again on an image of one frame, it is possible to perform the decoding.

The decoding method described in this embodiment is also available for not only the code scanner but also an apparatus for decoding the data such as optical disc play-back equipment.

This invention is also available to four value code. In this case, the threshold values are set from the peak levels for first value since the extent of defocus thereof is strong while the threshold values are set from the width lengths for second, third and fourth values since the extent of defocus thereof is weak.

Second Embodiment

In this embodiment, the following will describe a code scanner 100A which is provided with a photoirradiation portion 10. Since elements having names and signs like those of the above-mentioned first embodiment have like functions, the explanation thereof will be omitted.
(Configuration Example of Code Scanner 100A)

As shown in FIG. 11, the code scanner 100A is composed of the photoirradiation portion 10 and a signal-processing portion 20. The photoirradiation portion 10 is provided with a laser beam source 11, a condensing lens 13, an aperture stop 14 and a scanning mirror 15.

The photoirradiation portion 10 condenses the laser beam emitted from a light-emitting point 12 of the laser beam source 11 such as a semiconductor laser by the condensing lens 13 and then reduces its diameter by the aperture stop 14. It deflects the beam toward the object 50 to be read by the scanning mirror 15 and irradiates the beam on the code image 51 formed on the object 50 to be read.

The photoirradiation portion 10 then scans on the code image 51 by beam spots of the laser beam. Although the scanning mirror 15 is shown as a plane mirror in FIG. 11, a polygon mirror which is a regular polygon prism with mirror sides may be used therefor.

The signal-processing portion 20 is provided with the imaging lens 21, the image sensing device 22, the line extracting portion 23, the amplifier 24, the differentiator 25, the binarization circuit 26 and the decoder 27. The signal-processing portion 20 makes the scanned laser beam reflected by the code image 51 formed on the object 50 to be read incident on the imaging lens 21 to perform condensation of light and makes it image-form on the image sensing device 22 such as CCD and CMOS. The line extracting portion 23, the amplifier 24, the differentiator 25, the binarization circuit 26 and the decoder 27 are identical to them of the above-mentioned first embodiment, the description of which will be omitted.

Thus, the code scanner 100A according to the second embodiment is provided with the photoirradiation portion 10 irradiating the laser beam toward the object 50 to be read whereby it is possible to decode the read signal even when the read signal D1, D4 is based on the code image 51 which is spotted with a stain N or printing quality of which is inferior or even when the read signals D1, D4 are read in its defocus state.

This invention is excellent in that it is possible to decode the signal without using any complicated algorithm or fast CPU even when the object 50 to be read is spotted with a stain or the like or any printing quality thereof is inferior or even when the read signals are read in its defocus state by a new method in which a conventional algorithm is used while the threshold setting alters from the width lengths to the peak levels, which could not be easily to be invented by a person who has an ordinary skill in the art.

DESCRIPTION OF CODES

10: Photoirradiation portion; 11: Laser Beam Source; 12: Light-Emitting Point; 13: Condensing Lens; 14: Aperture Stop; 15: Scanning Mirror; 20: Signal-Processing Portion; 21: Imaging Lens; 22: Image Sensing Device (Read Signal Producing Portion); 23: Line Extracting Portion; 24: Amplifier; 25: Differentiator (Derivative Signal Producing Portion);

26: Binarization Circuit (Binarization Portion); 27: Decoder (Decoding Portion); 50: Object to be read; 51: Code Image; A1, A2, F1, F2: Inflection Points; B1 through B4, G1 through G4: Width Lengths; C1 through C4, H1 through H4: Peak Levels; D1, D4: Read Signal; D2, D5: Derivative Signal; D3, D6: Binarization Signal; E1 through E4, through 14: Normal Value Region; N: Strain; NB: Narrow Bar; NS: Narrow Space; WB: Wide Bar; and WS: Wide Space.

What is claimed is:

1. A decoding method comprising:
   a first step of performing photoelectric conversion on light reflected by an object to be read and producing a read signal indicating intensity of the reflected light;
   a second step of differentiating the read signal produced in the first step to produce a derivative signal;
   a third step of:
      detecting inflection points of intensity of the reflected light in the read signal from the derivative signal produced in the second step,
      detecting peak levels, each of which is an extreme value of the intensity of the reflected light, and each of which corresponds to a width length between the detected inflection points, and
      determining whether or not the difference between the peak levels is larger than a predetermined value,
         wherein, when a result of the determining is greater than the predetermined value, the threshold value is set from the width lengths and when a result of the determining is less than or equal to the predetermined value, the threshold value is set from the peak levels;
   a fourth step of:
      obtaining a difference between the peak levels detected in the third step, and
      setting a threshold value for decoding the read signal from the obtained difference between the peak levels; and
   a fifth step of decoding the read signal based on the threshold value set in the fourth step.

2. The decoding method according to claim 1, wherein in the second step, width length between the inflection points and the peak levels are aggregated and a normal value region relating to the width length and the peak levels is set based on the aggregation result, and the width length and the peak level outside the set normal value region are deleted as noise.

3. The decoding method according to claim 1, wherein in the third step, frequency distribution of the peak levels detected in the second step is obtained, and the threshold value for decoding the read signal is set based on the obtained frequency distribution.

4. A decoding-processing apparatus comprising:
   a read signal producing portion which performs photoelectric conversion on light reflected by an object to be read and produces a read signal indicating intensity of the reflected light;
   a derivative signal producing portion which differentiates the read signal produced in the read signal producing portion to produce a derivative signal;
   a binarization portion which binarizes the read signal based on the derivative signal produced in the derivative signal producing portion; and
   a decoding portion which:
      decodes the read signal that has been binarized by the binarization portion, wherein the binarization portion detects inflection points of intensity of the reflected light in the read signal from the derivative signal and detects peak levels, each of which is an extreme value of the intensity of the reflected light, the peak level corresponding to a width length between the detected inflection points,
      obtains a difference between the peak levels detected by the binarization portion,
      sets a threshold value for decoding the read signal from the obtained difference between the peak levels,
      decodes the read signal based on the set threshold value, and
      determines whether or not the difference between the peal levels is larger than a predetermined value,
         wherein, when the determined result is greater than the predetermined value, the threshold value is set from the width lengths, and when the determined result is less than or equal to the predetermined value, the threshold value is set from the peak levels.

* * * * *